US012604236B2

(12) United States Patent
Xiong et al.

(10) Patent No.: US 12,604,236 B2
(45) Date of Patent: Apr. 14, 2026

(54) INFORMATION EXCHANGE AND TUNNEL ESTABLISHMENT METHODS, APPARATUSES, COMMUNICATION NODES, AND STORAGE MEDIUM

(71) Applicant: ZTE CORPORATION, Shenzhen (CN)

(72) Inventors: Quan Xiong, Shenzhen (CN); Shaofu Peng, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 676 days.

(21) Appl. No.: 18/013,458

(22) PCT Filed: May 7, 2021

(86) PCT No.: PCT/CN2021/092137
§ 371 (c)(1),
(2) Date: Dec. 28, 2022

(87) PCT Pub. No.: WO2022/001365
PCT Pub. Date: Jan. 6, 2022

(65) Prior Publication Data
US 2023/0239733 A1 Jul. 27, 2023

(30) Foreign Application Priority Data

Jun. 28, 2020 (CN) .......................... 202010596533.6

(51) Int. Cl.
*H04W 28/06* (2009.01)
*H04W 76/12* (2018.01)

(52) U.S. Cl.
CPC ........... *H04W 28/06* (2013.01); *H04W 76/12* (2018.02)

(58) Field of Classification Search
CPC ...... H04W 28/06; H04W 76/12; H04L 45/04; H04L 45/50; H04L 47/825; H04L 45/34
See application file for complete search history.

(56) References Cited

U.S. PATENT DOCUMENTS 10,404,600 B2 * 9/2019 Shakir ................... H04L 47/125
11,838,200 B2 * 12/2023 Filsfils .................. H04L 45/741
(Continued)

FOREIGN PATENT DOCUMENTS

| CN | 108429685 A | 8/2018 |
| CN | 109218189 A | 1/2019 |
(Continued)

OTHER PUBLICATIONS

First Search Report in Chinese Application No. 2020105965336, dated Nov. 5, 2024, 8 pages, including translation.
(Continued)

*Primary Examiner* — Abdullahi Ahmed
(74) *Attorney, Agent, or Firm* — Morgan, Lewis & Bockius LLP

(57) ABSTRACT

Provided are an information exchange method and apparatus, a tunnel establishment method and apparatus, a communication node and a storage medium. The method includes: receiving segment routing Internet Protocol version 6 (SRv6) path segment compression information reported by a second communication node, where the SRv6 path segment compression information includes node construction information and node behavior information of an SRv6 path segment identifier; and sending SRv6 path segment compression configuration information to a third communication node according to the SRv6 path segment compression information.

15 Claims, 5 Drawing Sheets

Receive SRv6 path segment compression information reported by a second communication node, where the SRv6 path segment compression information includes node construction information and node behavior information of an SRv6 path segment identifier ～110

Send SRv6 path segment compression configuration information to a third communication node according to the SRv6 path segment compression information ～120

(56)         References Cited

U.S. PATENT DOCUMENTS

| | | | | |
|---|---|---|---|---|
| 2019/0081897 A1* | 3/2019 | Shakir | | H04L 45/12 |
| 2020/0153732 A1* | 5/2020 | Negi | | H04L 45/12 |
| 2020/0229042 A1* | 7/2020 | Srivastava | | H04L 69/22 |
| 2022/0217081 A1* | 7/2022 | Li | | H04L 45/566 |
| 2023/0353492 A1* | 11/2023 | Chen | | H04L 45/50 |
| 2025/0247327 A1* | 7/2025 | Nguyen | | H04L 45/76 |

FOREIGN PATENT DOCUMENTS

| | | |
|---|---|---|
| CN | 109688057 A | 4/2019 |
| CN | 110971433 A | 4/2020 |
| CN | 112511430 A | 3/2021 |
| EP | 3651423 A1 | 5/2020 |
| WO | WO2019/128950 A1 | 7/2019 |

OTHER PUBLICATIONS

First Office Action in Chinese Application No. 202010596533.6, dated Nov. 5, 2024, 18 pages, including translation.

Chang et al. "Compressed SRv6 Segment List Encoding in SRH", draft-ietf-spring-srv6-srh-compression-01, IETF Datatracker, https://datatracker.ietf.org/drafts/current/, Mar. 2022.

Extended European Search Report in Application No. 21832225.3, dated Jun. 7, 2024, 12 pages.

Liu et al.: "BGP Extensions for Unified SID in TE Policy; draft-liu-idr-segment-routing-te-policy-complement-03.txt", BGP Extensions for Unified SID in TE Policy; DRAFT-LIU-IDR-SEGMENT-ROUTING-TE-POLICY-COMPLEMENT-03.TXT; Internet-Draft: IDR Working Group, Internet Engineering Task Force, IETF; Standardworkingdraft, No. 3, May 12, 2020, pp. 1-12.

Ran et al.: "IGP Extensions for Shorter SRv6 SID; draft-chen-lsr-igp-shorter-srv6-extensions - 01.txt", IGP Extensions for Shorter SRV6 SID; DRAFT-CHEN-LSR-IGP-SHORTER-SRV6-EXTEN-SIONS-01.TXT; Internet-Draft: LSR WG, Internet Engineering Task Force, IETF; Standardworkingdraft, Internet Society (ISOC) 4, No. 1, May 11, 2020, pp. 1-8.

C. Fisfils et al., "SRv6 Network Programming", IETF draft-filsfils-spring-srv6- network-programming-00, Mar. 31, 2017, entire document.

International Search Report in Application No. PCT/CN2021/092137 dated Jul. 31, 2021, 4 pages including translation.

* cited by examiner

```
 0                     1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+-
|      Type       |        Length        |          Reserved            |
+-+-+-+-+-+-+-+-+-+-+-+-+-+-+-+-+-+-+-+-+-+-+-+-+-+-+-+-+-+-+-+-+-
|         Flags             |UET|    CP Len     | Compressed SID Len |
+-+-+-+-+-+-+-+-+-+-+-+-+-+-+-+-+-+-+-+-+-+-+-+-+-+-+-+-+-+-+-+-+-
```

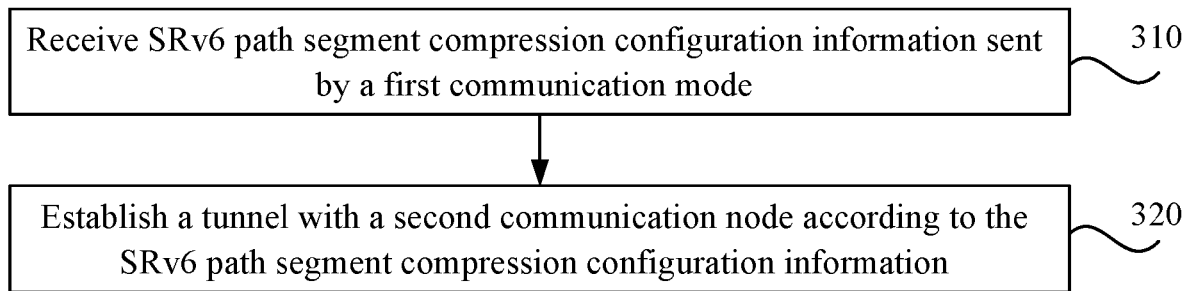

| Receive SRv6 path segment compression configuration information sent by a first communication mode | 310 |
|---|---|
| Establish a tunnel with a second communication node according to the SRv6 path segment compression configuration information | 320 |

FIG. 12

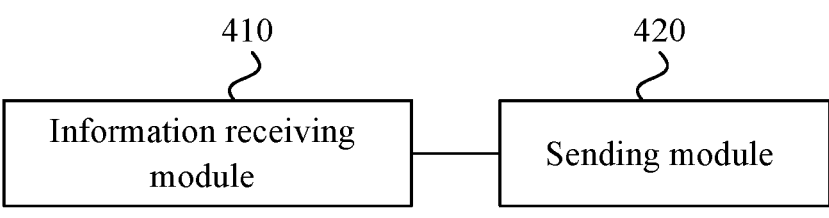

410         420

| Information receiving module | Sending module |
|---|---|

FIG. 13

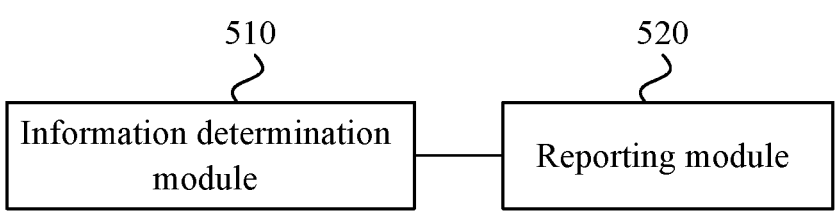

510         520

| Information determination module | Reporting module |
|---|---|

FIG. 14

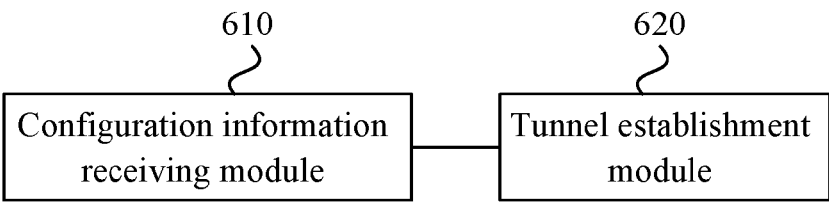

610         620

| Configuration information receiving module | Tunnel establishment module |
|---|---|

FIG. 15

INFORMATION EXCHANGE AND TUNNEL ESTABLISHMENT METHODS, APPARATUSES, COMMUNICATION NODES, AND STORAGE MEDIUM

CROSS REFERENCE TO RELATED APPLICATIONS

This is a National Stage Application filed under 35 U.S.C. 371, based on International Patent Application No. PCT/CN2021/092137, filed May 7, 2021, which claims priority to Chinese Patent Application No. 202010596533.6 filed with the China National Intellectual Property Administration (CNIPA) on Jun. 28, 2020, the disclosures of which are incorporated herein by reference in their entireties.

TECHNICAL FIELD

The present application relates to wireless communication networks, for example, an information exchange method and apparatus, a tunnel establishment method and apparatus, a communication node and a storage medium.

BACKGROUND

Segment routing (SR) technology is to press a string of ordered tags (a segment identifier (SID)) into a source node to indicate packet forwarding, thereby conveniently implementing a network load balance and topology-independent Fast Reroute protection. In the case where the SR technology is applied to a Multiprotocol Label Switching-Transport Profile (MPLS-TP) network, a path segment or a path SID is introduced so that an SR path can be identified, achieving the bidirectional binding of SR paths. However, the path SID based on the SR and the Internet Protocol causes a large packet overhead and a low network link bandwidth utilization rate. Thus, a relatively high requirement is put on the processing capability of a chip and the processing efficiency of the chip is reduced in a processing process. A failure to perform a reliable and efficient exchange between nodes in a path affects the efficiency of the bidirectional binding of SR paths and the establishment of a bidirectional tunnel, which cannot satisfy the requirements of practical application.

SUMMARY

The present application provides an information exchange method and apparatus, a tunnel establishment method and apparatus, a communication node and a storage medium so that a segment routing Internet Protocol version 6 (SRv6) path segment identifier is compressed, reducing the overhead of the path segment identifier and achieving an efficient exchange between a second communication node and a third communication node.

An embodiment of the present application provides an information exchange method applied by a first communication node. The method includes: receiving SRv6 path segment compression information reported by a second communication node, where the SRv6 path segment compression information includes node construction information and node behavior information of an SRv6 path segment identifier; and sending SRv6 path segment compression configuration information to a third communication node according to the SRv6 path segment compression information.

An embodiment of the present application further provides an information exchange method applied by a second communication node. The method includes: determining SRv6 path segment compression information, where the SRv6 path segment compression information includes node construction information and node behavior information of an SRv6 path segment identifier; and reporting the SRv6 path segment compression information to a first communication node.

An embodiment of the present application further provides a tunnel establishment method applied by a third communication node. The method includes: receiving SRv6 path segment compression configuration information sent by a first communication node; and establishing a tunnel with a second communication node according to the SRv6 path segment compression configuration information.

An embodiment of the present application further provides an information exchange apparatus including an information receiving module and a sending module. The information receiving module is configured to receive SRv6 path segment compression information reported by a second communication node, where the SRv6 path segment compression information includes node construction information and node behavior information of an SRv6 path segment identifier. The sending module is configured to send SRv6 path segment compression configuration information to a third communication node according to the SRv6 path segment compression information.

An embodiment of the present application further provides an information exchange apparatus including an information determination module and a reporting module. The information determination module is configured to determine SRv6 path segment compression information, where the SRv6 path segment compression information includes node construction information and node behavior information of an SRv6 path segment identifier. The reporting module is configured to report the SRv6 path segment compression information to a first communication node.

An embodiment of the present application further provides a tunnel establishment apparatus including a configuration information receiving module and a tunnel establishment module. The configuration information receiving module is configured to receive SRv6 path segment compression configuration information sent by a first communication node. The tunnel establishment module is configured to establish a tunnel with a second communication node according to the SRv6 path segment compression configuration information.

An embodiment of the present application further provides a communication node including one or more processors and a storage device. The storage device is configured to store one or more programs, where the one or more programs are executed by the one or more processors to cause the one or more processors to perform the preceding information exchange method applied by a first communication node, the preceding information exchange method applied by a second communication node or the preceding tunnel establishment method applied by a third communication node.

An embodiment of the present application further provides a computer-readable storage medium, which is configured to store a computer program, where the program is executed by a processor to cause the processor to perform the preceding information exchange method.

BRIEF DESCRIPTION OF DRAWINGS

FIG. 12 is a flowchart of a tunnel establishment method according to an embodiment.

FIG. 13 is a structural diagram of an information exchange apparatus according to an embodiment.

FIG. 14 is a structural diagram of an information exchange apparatus according to another embodiment.

FIG. 15 is a structural diagram of a tunnel establishment apparatus according to an embodiment.

DETAILED DESCRIPTION

Figure 1:
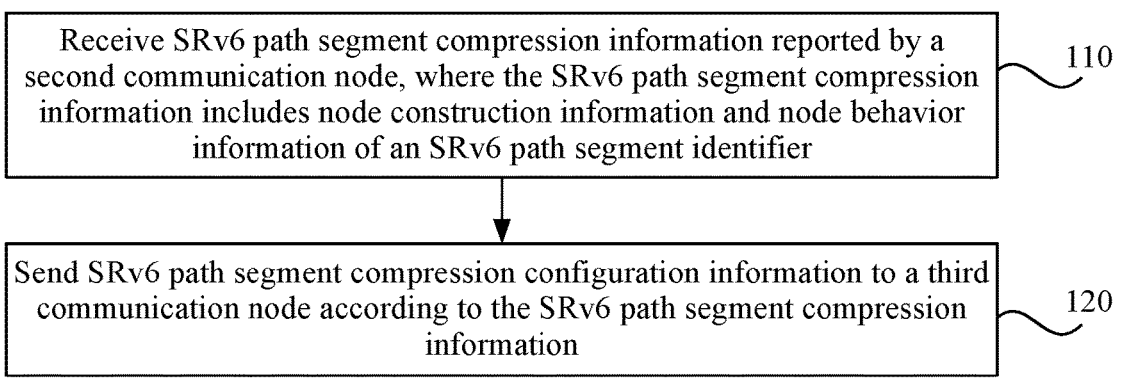
FIG. 1 is a flowchart of an information exchange method according to an embodiment.

The present application is described hereinafter in conjunction with drawings and embodiments. It is to be understood that the embodiments described herein are intended to explain the present application and not to limit the present application. For ease of description, only part, not all, of structures related to the present application are illustrated in the drawings.

An SR control plane notifies SR identifiers by using an interior gateway protocol (IGP) extension, simplifying network management and maintenance. An end-to-end path can be established by simply operating a head node based on SR, greatly improving traffic deployment efficiency. The SR supports Multiprotocol Label Switching (MPLS) and Internet Protocol version 6 (IPv6) data plane forwarding. In the case where SR technology is applied to an MPLS-TP network, the SR also requires an extension to support the establishment of a bidirectional tunnel.

Since only the head node maintains the connected state of an SR tunnel and a tail node carries no connection information, the association and binding of two unidirectional tunnels cannot be achieved at both ends, resulting in a limitation to SR application.

A path segment or a path SID is introduced for identifying an SR path, the path SID is located after the last SR segment as an SR path segment identifier, and the nodes at both ends of the SR path need to maintain a mapping relationship between SR path information and path SIDs so that the binding of the bidirectional tunnel can be achieved. The path SID of an SRv6 data plane (that is, SRv6 path SID) has a length of 128 bits, can uniquely identify an SRv6 tunnel, and is used for identifying an SRv6 path segment in an SRv6 domain, so as to achieve the binding of an SRv6 bidirectional tunnel. However, the following problems exist: (1) the path SID has a large overhead and a network link bandwidth utilization rate is low; (2) an SRv6 packet has a high requirement on a chip and an existing network device cannot support deep replication and operation, reducing the processing efficiency of the chip.

An embodiment of the present application provides an information exchange method. The method may be applied by a first communication node such as a controller or a network management device. FIG. 1 is a flowchart of an information exchange method according to an embodiment. As shown in FIG. 1, the method provided in the embodiment includes step 110 and step 120.

In step 110, SRv6 path segment compression information reported by a second communication node is received, where the SRv6 path segment compression information includes node construction information and node behavior information of an SRv6 path segment identifier.

In the embodiment, the second communication node is, for example, a tail node of an SRv6 path in an SRv6 network, and the second communication node reports the node construction information (endpoint structure) and the node behavior information (endpoint behavior) of the SRv6 path SID to the first communication node, for example, reports a length of a locator block, a length of a locator node, a length of a function, a length of arguments, a compression type and the like of the SRv6 path segment. On this basis, the first communication node may send configuration information related to the compressed SRv6 path SID to a third communication node as the basis for tunnel establishment.

In some embodiments, the second communication node reports the SRv6 path segment compression information through an extended Border Gateway Protocol-Link State (BGP-LS) or a Path Computation Element Communication Protocol (PCEP).

In step 120, the SRv6 path segment compression configuration information is sent to the third communication node according to the SRv6 path segment compression information.

In the embodiment, the third communication node is, for example, a head node (corresponding to the tail node) of the SRv6 path in the SRv6 network, and the first communication node sends the compression configuration information of the SRv6 path SID to the third communication node, for example, common prefix length information of the SRv6 path SID, a length of the compressed SRv6 path SID, the compression encapsulation type and the like.

After the SRv6 path SID is compressed, it is called a compressed path SID (C-PSID). The SRv6 path SID may be maintained by the second communication node (for example, the tail node) or the first communication node (for example, the controller). For example, the second communication node maintains a local list of path segments of the second communication node, or the first communication node maintains a local list of path segments of the first communication node. For example, the SRv6 path SID may be represented by four terms B: N: Funct: ARGS, which are the locator block, locator node, function and arguments of the SRv6 path SID, respectively. On the SRv6 paths to which the tail node belongs, path SIDs have the same locator block so that the SRv6 path SID may be compressed and optimized, for example, compressed to N: Funct: ARGS or N: Funct. The length of the SRv6 path SID may be compressed to 32 bits or the like, with other bits being zero.

In an embodiment, the first communication node sends the SRv6 path segment compression configuration information through an extended Border Gateway Protocol (BGP) or PCEP.

In some embodiments, in the scenario where a bidirectional tunnel is established, nodes in the SRv6 network constitute a forward path and a reverse path, where the head node and the tail node of the forward path are the tail node and the head node of the reverse path, respectively. In this case, the node located at the boundary of the SRv6 path is both the head node on the path in one direction and the tail node on the path in the other direction. That is, the first communication node needs to receive SRv6 path segment compression information reported by tails nodes in two directions and send the SRv6 path segment compression configuration information to head nodes in the two directions.

In the embodiment, the SRv6 path segment compression information reported by the second communication node is received, and the SRv6 path segment compression configuration information is sent to the third communication node so that the SRv6 path SID is compressed, reducing the overhead of the path SID, and the second communication node and the third communication node exchange efficiently, improving the processing efficiency of a chip and providing a reliable basis for establishing the bidirectional tunnel between the third communication node and the second communication node.

In an embodiment, the node construction information of the SRv6 path segment identifier includes length information of the locator block, length information of the locator node, length information of the function, length information of the arguments and the compression encapsulation type of the SRv6 path segment identifier.

In the embodiment, the node construction information of the SRv6 path SID reported by the second communication node to the first communication node includes the length information of the locator block, the length information of the locator node, the length information of the function, the length information of the arguments and the compression encapsulation type (Unified-SID Encapsulation Type (UET)) of the SRv6 path SID.

In an embodiment, the node behavior information of the SRv6 path segment identifier includes a terminal behavior type of the SRv6 path segment identifier and IGP algorithm type information corresponding to the SRv6 path segment identifier.

In the embodiment, the node behavior information of the SRv6 path SID reported by the second communication node to the first communication node includes the terminal behavior type of the second communication node and the corresponding IGP algorithm type.

In an embodiment, the SRv6 path segment compression configuration information includes the common prefix length information of the SRv6 path segment identifier, the length information of the compressed SRv6 path segment identifier and the compression encapsulation type.

In the embodiment, the first communication node compresses the SRv6 path SID according to the SRv6 path segment compression information and sends the SRv6 path segment compression configuration information to the third communication node. The SRv6 path segment compression configuration information may include a common prefix length of the locator block of the SRv6 path SID, a length of the compressed SRv6 path SID, the UET and the like, thereby exchanging the SRv6 path segment compression information and providing the basis for tunnel establishment.

In an embodiment, the first communication node is the controller.

In an embodiment, the SRv6 path segment compression information is received through the BGP-LS or the PCEP. In the embodiment, a sub-TLV of the BGP-LS or the PCEP may be extended for a sub-sub-TLV, so as to exchange the SRv6 path segment compression information.

In an embodiment, the sub-TL V of the BGP-LS or the PCEP includes: a first bit flag as an extension for indicating that the SRv6 path segment identifier needs to be compressed and the sub-TL V carries the SRv6 path segment compression information; a structure sub-sub-TLV of the SRv6 path segment identifier as an extension for representing the node construction information of the path segment identifier; and a behavior sub-sub-TLV of the SRv6 path segment identifier as an extension for representing the node behavior information of the path segment identifier.

In an embodiment, the SRv6 path segment compression configuration information is sent through the BGP or the PCEP. In the embodiment, a sub-TL V of the BGP or the PCEP may be extended for a sub-sub-TLV, so as to exchange the SRv6 path segment compression configuration information.

In an embodiment, the sub-TLV of the BGP or the PCEP includes: a second bit flag as an extension for indicating that the SRv6 path segment identifier needs to be compressed and the sub-TLV carries the SRv6 path segment compression configuration information; and a compressed sub-sub-TLV of the SRv6 path segment identifier as an extension for indicating the SRv6 path segment compression configuration information.

Figure 2:
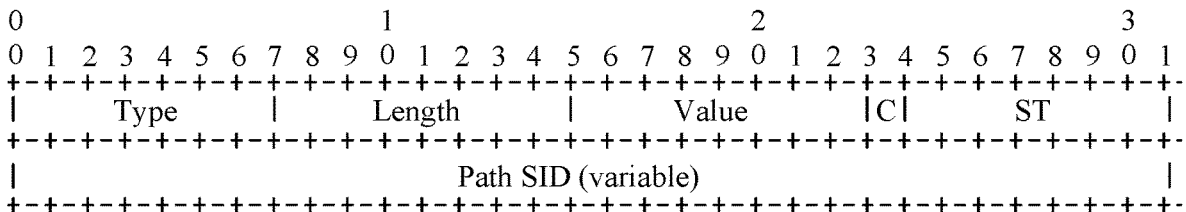
FIG. 2 is a schematic diagram of a first bit flag as an extension in a BGP-LS-based sub-tag-length-value (TLV) according to an embodiment.

FIG. 2 is a schematic diagram of a first bit flag as an extension in a BGP-LS-based sub-TLV according to an embodiment. As shown in FIG. 2, in the embodiment, the first bit flag "C" is an extension in the BGP-LS-based sub-TLV and used for indicating that the SRv6 path segment identifier needs to be compressed and the sub-TLV carries the SRv6 path segment compression information.

Figure 3:
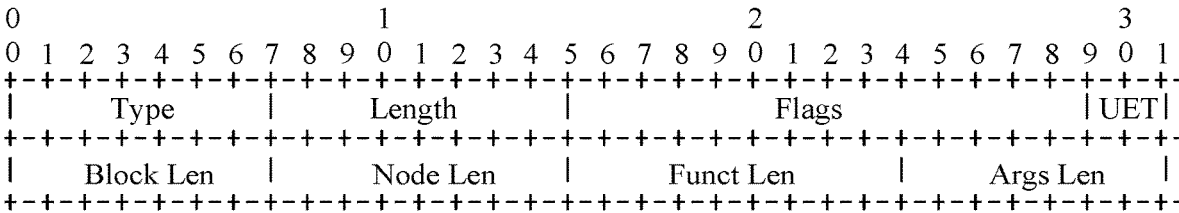
FIG. 3 is a schematic diagram of a BGP-LS-based structure sub-sub-TLV of an SRv6 path segment identifier as an extension according to an embodiment.

FIG. 3 is a schematic diagram of a BGP-LS-based structure sub-sub-TLV of an SRv6 path segment identifier as an extension according to an embodiment. In the embodiment, the structure sub-sub-TLV (PATH-SEGMENT-STRUCTURE Sub-sub-TLV) of the path segment identifier is an extension in the BGP-LS-based sub-TLV and used for representing the node construction information of the path segment identifier. As shown in FIG. 3, Type has 8 bits; Length has 8 bits and is used for indicating the length of the sub-sub-TLV. The structure sub-sub-TLV of the path segment identifier includes the following fields: UET has 2 bits and is used for indicating the compression encapsulation type, where for the definition of UET values, reference may be made to an identifier draft-mirsky-6man-unified-id-sr-05; Block Len has 8 bits and is used for indicating the length of the locator block of the SRv6 path SID in bits; Node Len has 8 bits and is used for indicating the length of the node of the SRv6 path SID in bits; Funct Len has 8 bits and is used for indicating the length of the function of the SRv6 path SID in bits; and Args Len has 8 bits and is used for indicating the length of the arguments of the SRv6 path SID in bits.

Figure 4:
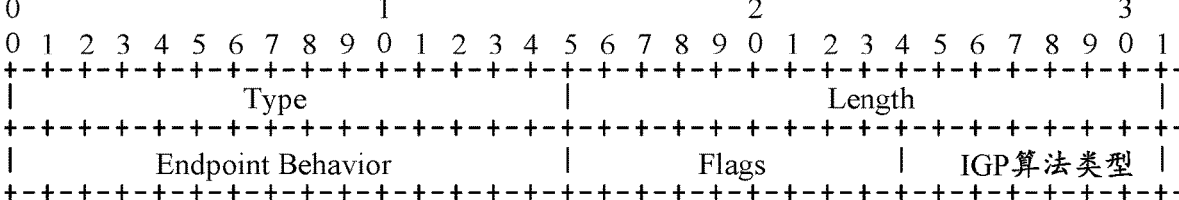
FIG. 4 is a schematic diagram of a BGP-LS-based behavior sub-sub-TLV of an SRv6 path segment identifier as an extension according to an embodiment.

FIG. 4 is a schematic diagram of a BGP-LS-based behavior sub-sub-TLV of an SRv6 path segment identifier as an extension according to an embodiment. In the embodiment, the behavior sub-sub-TLV (PATH-SEGMENT-BEHAVIOR Sub-sub-TLV) of the path segment identifier is an extension in the BGP-LS-based sub-TLV and used for representing the node behavior information of the path segment identifier. As shown in FIG. 4, Type has 16 bits; Length has 16 bits and is used for indicating the length of the sub-sub-TLV. The behavior sub-sub-TL V of the path segment identifier includes the fields below.

Endpoint Behavior has 16 bits and is used for indicating the terminal behavior type of the second communication node (that is, the tail node, End.PSID), such as End.PSID (UET32 Flavor) or End.PSID (UET16 Flavor). End.PSID (UET32 Flavor) indicates that a terminal compresses the SRv6 path SID to 32 bits, and End.PSID (UET16 Flavor) indicates that the terminal compresses the SRv6 path SID to 16 bits.

Flags have 8 bits and are reserved.

IGP Algorithm has 8 bits and is used for indicating the IGP algorithm type corresponding to the SRv6 path SID.

Figure 5:
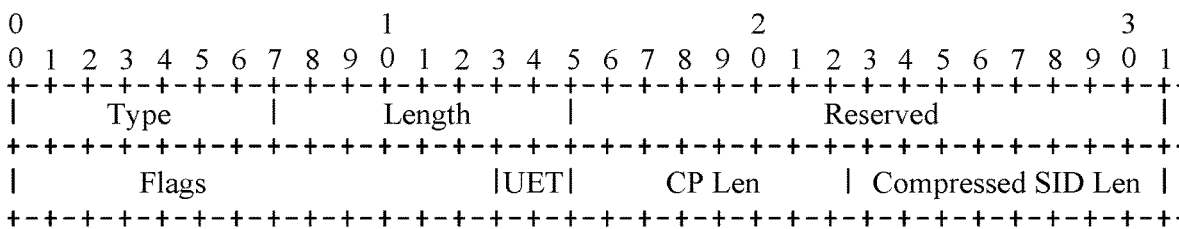
FIG. 5 is a schematic diagram of a BGP-based compressed sub-sub-TLV of an SRv6 path segment identifier as an extension according to an embodiment.

FIG. 5 is a schematic diagram of a BGP-based compressed sub-sub-TLV of an SRv6 path segment identifier as an extension according to an embodiment. In the embodiment, the compressed sub-sub-TLV (PATH-SEGMENT-COMPRESSED Sub-sub-TLV) of the SRv6 path segment identifier is an extension in a BGP-based sub-TL V and used for indicating the SRv6 path segment compression configuration information. As shown in FIG. 5, Type has 8 bits; Length has 8 bits and is used for indicating the length of the sub-sub-TLV. The compressed sub-sub-TLV of the path segment identifier includes the fields below.

UET has 2 bits and is used for indicating the UET of the SRv6 path SID, where for the definition of UET values, reference may be made to the identifier draft-mirsky-6man-unified-id-sr-05. The UET may be used for indicating whether the segment identifier of a virtual private network (VPN) in an overlay mode needs to be compressed.

Common Prefix Length (CP Len) has 8 bits and is used for indicating the common prefix length of the SRv6 path SID, such as the length of the locator block of the SRv6 path SID in bits, which has a value range of [1-128].

Compressed SID Len has 8 bits and is used for indicating the length of the compressed SRv6 path SID in bits, which has a value range of [1-128].

Figure 6:
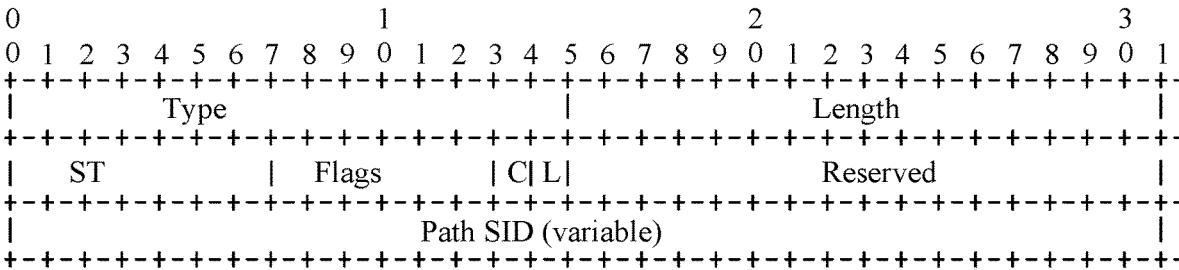
FIG. 6 is a schematic diagram of a first bit flag as an extension in a PCEP-based sub-TLV according to an embodiment.

FIG. 6 is a schematic diagram of a first bit flag as an extension in a PCEP-based sub-TLV according to an embodiment. As shown in FIG. 6, in the embodiment, the first bit flag "C" is an extension in the PCEP-based sub-TLV and used for indicating that the SRv6 path segment identifier needs to be compressed and the sub-TLV carries the SRv6 path segment compression information. The first bit flag as an extension in the PCEP-based sub-TL V may be the same as or different from the first bit flag as an extension in the BGP-LS-based sub-TLV in the preceding embodiment.

Figure 7:
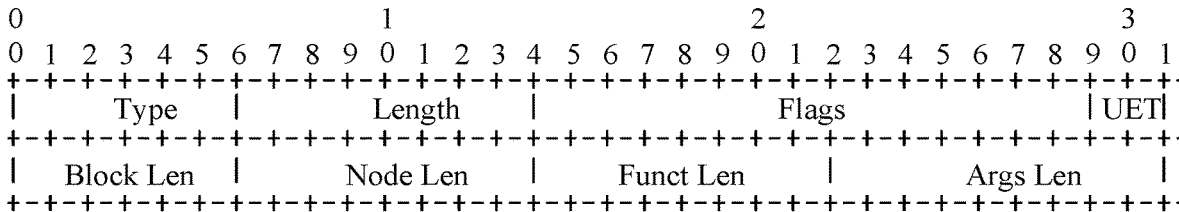
FIG. 7 is a schematic diagram of a PCEP-based structure sub-sub-TLV of an SRv6 path segment identifier as an extension according to an embodiment.

FIG. 7 is a schematic diagram of a PCEP-based structure sub-sub-TLV of an SRv6 path segment identifier as an extension according to an embodiment. In the embodiment, the structure sub-sub-TLV (PATH-SEGMENT-STRUCTURE Sub-sub-TLV) of the path segment identifier is an extension in the PCEP-based sub-TLV and used for representing the node construction information of the path segment identifier. As shown in FIG. 7, Type has 8 bits; Length has 8 bits and is used for indicating the length of the sub-sub-TLV. The structure sub-sub-TLV of the path segment identifier includes the fields below.

UET has 2 bits and is used for indicating the UET, where for the definition of UET values, reference may be made to the identifier draft-mirsky-6man-unified-id-sr-05.

Block Len has 8 bits and is used for indicating the length of the locator block of the SRv6 path SID in bits.

Node Len has 8 bits and is used for indicating the length of the node of the SRv6 path SID in bits.

Funct Len has 8 bits and is used for indicating the length of the function of the SRv6 path SID in bits.

Args Len has 8 bits and is used for indicating the length of the arguments of the SRv6 path SID in bits.

Figure 8:
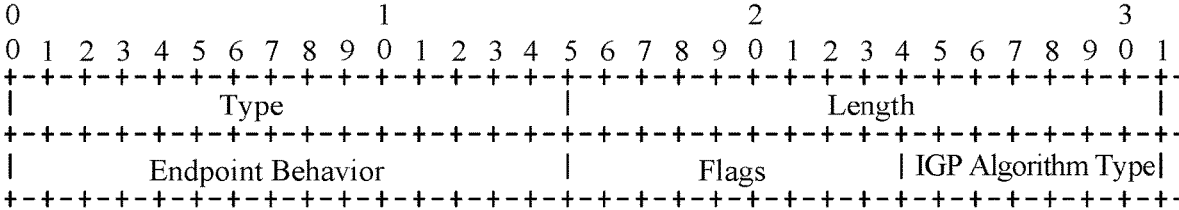
FIG. 8 is a schematic diagram of a PCEP-based behavior sub-sub-TL V of an SRv6 path segment identifier as an extension according to an embodiment.

FIG. 8 is a schematic diagram of a PCEP-based behavior sub-sub-TL V of an SRv6 path segment identifier as an extension according to an embodiment. In the embodiment, the behavior sub-sub-TLV (PATH-SEGMENT-BEHAVIOR Sub-sub-TLV) of the path segment identifier is an extension in the PCEP-based sub-TLV and used for representing the node behavior information of the path segment identifier. As shown in FIG. 8, Type has 16 bits; Length has 16 bits and is used for indicating the length of the sub-sub-TLV. The behavior sub-sub-TLV of the path segment identifier includes the fields below.

Endpoint Behavior has 16 bits and is used for indicating the terminal behavior type of the second communication node (that is, the tail node, End.PSID), such as End.PSID (UET32 Flavor) or End.PSID (UET16 Flavor).

Flags have 8 bits and are reserved.

IGP Algorithm has 8 bits and is used for indicating the IGP algorithm type corresponding to the SRv6 path SID.

Figure 9:
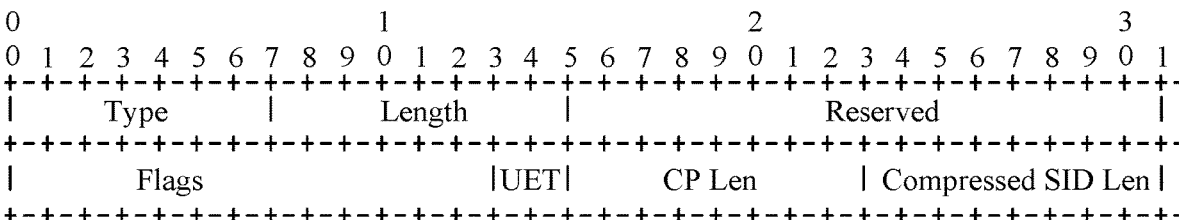
FIG. 9 is a schematic diagram of a PCEP-based compressed sub-sub-TLV of an SRv6 path segment identifier as an extension according to an embodiment.

FIG. 9 is a schematic diagram of a PCEP-based compressed sub-sub-TLV of an SRv6 path segment identifier as an extension according to an embodiment. In the embodiment, the compressed sub-sub-TLV (PATH-SEGMENT-COMPRESSED Sub-sub-TLV) of the SRv6 path segment identifier is an extension in the PCEP-based sub-TLV and used for indicating the SRv6 path segment compression configuration information. As shown in FIG. 9, Type has 8 bits; Length has 8 bits and is used for indicating the length of the sub-sub-TLV. The compressed sub-sub-TL V of the path segment identifier includes the fields below. UET has 2 bits and is used for indicating the UET of the SRv6 path SID, where for the definition of UET values, reference may be made to the identifier draft-mirsky-6man-unified-id-sr-05. The UET may be used for indicating whether the segment identifier of the VPN in the overlay mode needs to be compressed. CP Len has 8 bits and is used for indicating the common prefix length of the SRv6 path SID, such as the length of the locator block of the SRv6 path SID in bits, which has a value range of [1-128]. Compressed SID Len has 8 bits and is used for indicating the length of the compressed SRv6 path SID in bits, which has a value range of [1-128].

The compression information exchange method in the preceding embodiments is applicable to any SRv6 tag for identifying a path, such as a stitch tag (binding SID) for identifying and stitching SID link lists and reducing an SR tag stack in the SRv6 network.

Figure 10:
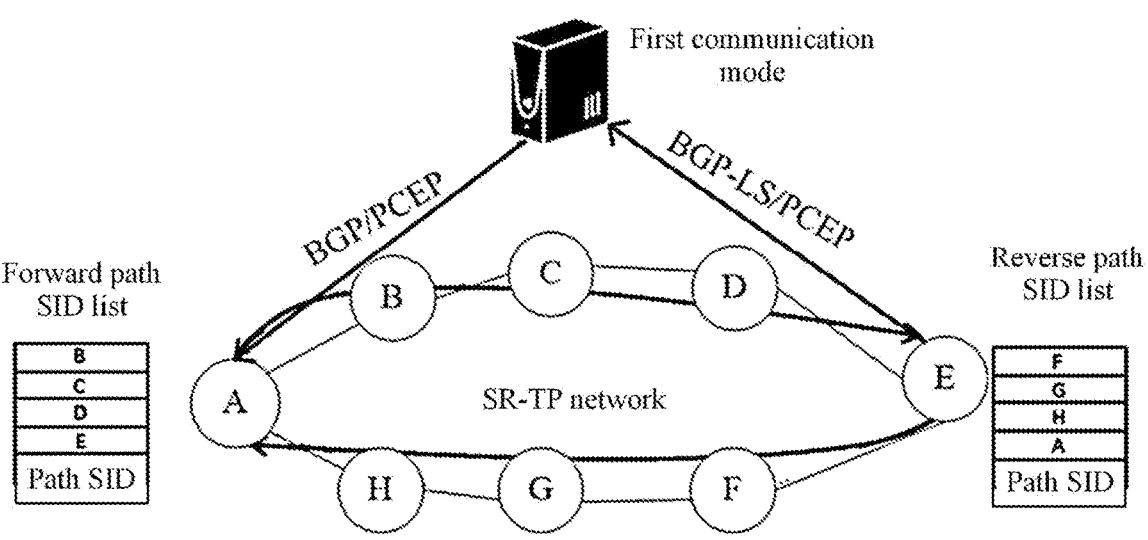
FIG. 10 is a schematic diagram of an information exchange between communication nodes in an SRv6 network according to an embodiment.

FIG. 10 is a schematic diagram of an information exchange between communication nodes in an SRv6 network according to an embodiment. As shown in FIG. 10, the network adopts an SRv6 data plane, and the controller (that is, the first communication node) calculates paths from node A (that is, the head node in a forward path and the tail node in a reverse path) to node E (that is, the tail node in the forward path and the head node in the reverse path), respectively. Two unidirectional label switched paths (LSPs) are established from the head node to the tail node, separately: LSP1 is a forward connection from A to E and the path is A→B→C→D→E; LSP2 is a reverse connection from E to A and the path is E→F→G→H→A; and the path segment identifiers of the two paths are path SID1 and path SID2, separately.

An information exchange process is described by using an example in which the SRv6 path segment compression information is reported based on the BGP-LS and the SRv6 path segment compression configuration information is sent based on the BGP. An exchange flow of the compression information of the SRv6 path segment identifier is described below.

(1) Node E and node A notify the controller of compression information of SRv6 path SID1 and SRv6 path SID2 through the sub-TL V of the BGP-LS protocol, respectively. For example, the first bit flag is an extension in the sub-TLV; the length information of the locator block, node, function and arguments and the UET of the SRv6 path segment identifier are reported through an extension, the structure sub-sub-TLV of the path segment identifier; and the common prefix length, the terminal behavior type (End.PSID) and the corresponding IGP algorithm type of the SRv6 path segment identifier are reported through an extension, the behavior sub-sub-TLV of the path segment identifier.

(2) The controller sends the compression configuration information of SRv6 path SID1 and SRv6 path SID2 to node A and node E through the sub-TLV of the BGP, respectively. For example, the second bit flag (C being set to 1) is an extension in the sub-TLV and used for indicating that the corresponding path SID needs to be compressed and the compression configuration information is carried in an extension, the compressed sub-sub-TLV of the path segment identifier, thereby compressing the SRv6 path segment identifier and notifying relevant information.

(3) Node A and node E bind the paths in two directions by using SRv6 path SID1 and SRv6 path SID2, respectively, so as to establish a segment routing-transport profile (SR-TP) bidirectional tunnel.

An example in which the SRv6 path segment compression information and the SRv6 path segment compression configuration information are exchanged based on the PCEP is used for description. An exchange flow of path compression information is described below.

(1) Node E and node A notify the controller of compression information of SRv6 path SID1 and SRv6 path SID2 through the sub-TL V of the PCEP, respectively. For example, the first bit flag is an extension in the sub-TLV; the length information of the locator block, node, function and arguments and the UET of the SRv6 path segment identifier are reported through an extension, the structure sub-sub-TLV of the path segment identifier; and the common prefix length, the terminal behavior type (End.PSID) and the corresponding IGP algorithm type of the SRv6 path segment identifier are reported through an extension, the behavior sub-sub-TLV of the path segment identifier.

(2) The controller sends the compression configuration information of SRv6 path SID1 and SRv6 path SID2 to node A and node E through the sub-TLV of the PCEP, respectively. For example, the second bit flag (C being set to 1) is an extension in the sub-TLV and used for indicating that the corresponding path SID needs to be compressed and the compression configuration information is carried in an extension, the compressed sub-sub-TLV of the path segment identifier, thereby compressing the SRv6 path segment identifier and notifying relevant information.

(3) Node A and node E bind the paths in two directions by using SRv6 path SID1 and SRv6 path SID2, respectively, so as to establish an SR-TP bidirectional tunnel.

An embodiment of the present application further provides an information exchange method. The method may be applied by a second communication node such as a tail node in an SRv6 path. In the embodiment, the operations performed by the second communication node correspond to the operations performed by the first communication node in the preceding embodiments. For technical details not described in the embodiment, reference may be made to any one of the preceding embodiments.

Figure 11:
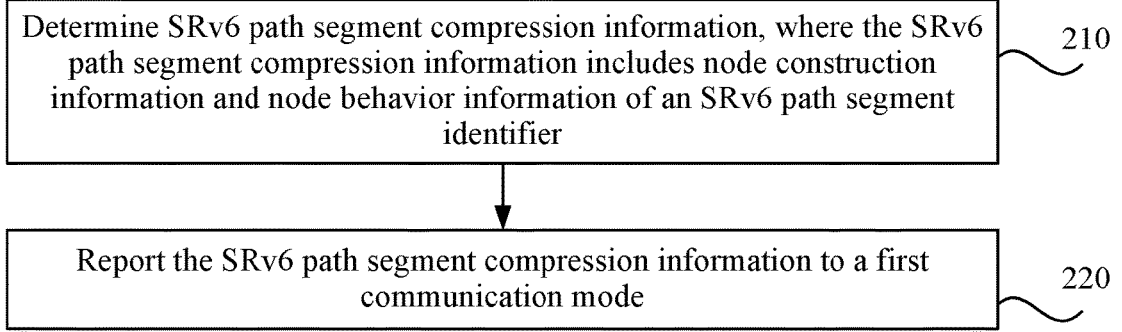
FIG. 11 is a flowchart of an information exchange method according to another embodiment.

FIG. 11 is a flowchart of an information exchange method according to another embodiment. As shown in FIG. 11, the method provided in the embodiment includes step 210 and step 220.

In step 210, SRv6 path segment compression information is determined, where the SRv6 path segment compression information includes node construction information and node behavior information of an SRv6 path segment identifier.

In step 220, the SRv6 path segment compression information is reported to the first communication mode.

In the embodiment, the second communication node reports the SRv6 path segment compression information so that the SRv6 path segment identifier is compressed, reducing the overhead of the path segment identifier, improving the exchange efficiency of the SRv6 path segment identifier and the processing efficiency of a chip, and providing a reliable basis for tunnel establishment.

In an embodiment, the node construction information of the SRv6 path segment identifier includes length information of a locator block, length information of a locator node, length information of a function, length information of arguments and a compression encapsulation type of the path segment identifier; and the node behavior information of the SRv6 path segment identifier includes a terminal behavior type and corresponding IGP algorithm type information.

In an embodiment, the second communication node is a head node or a tail node of an SRv6 network.

In an embodiment, the SRv6 path segment compression information is reported through a BGP-LS or a PCEP.

A sub-TLV of the BGP-LS or the PCEP includes: a first bit flag as an extension for indicating that the SRv6 path segment identifier needs to be compressed and the sub-TLV carries the SRv6 path segment compression information; a structure sub-sub-TLV of the SRv6 path segment identifier as an extension for representing the node construction information of the SRv6 path segment identifier; and a behavior sub-sub-TLV of the SRv6 path segment identifier as an extension for representing the node behavior information of the SRv6 path segment identifier.

An embodiment of the present application further provides a tunnel establishment method. The method may be applied by a third communication node. A second communication node is, for example, a tail node in an SRv6 path. In the embodiment, the operations performed by the third communication node correspond to the operations performed by the first communication node in the preceding embodiments. For technical details not described in the embodiment, reference may be made to any one of the preceding embodiments.

FIG. 12 is a flowchart of a tunnel establishment method according to an embodiment. As shown in FIG. 12, the method provided in the embodiment includes step 310 and step 320.

In step 310, SRv6 path segment compression configuration information sent by the first communication mode is received.

In step 320, a tunnel with the second communication node is established according to the SRv6 path segment compression configuration information.

In the embodiment, the third communication node receives SRv6 path segment compression configuration information sent by the first communication mode and establishes the tunnel according to the compressed SRv6 path segment identifier, reducing the overhead of the path segment identifier, achieving an efficient exchange, and improving the processing efficiency of a chip. On this basis, the tunnel is accurately established.

In an embodiment, the SRv6 path segment compression configuration information includes common prefix length information of an SRv6 path segment identifier, length information of the compressed SRv6 path segment identifier and a compression encapsulation type.

In an embodiment, the third communication node is a head node of an SRv6 network.

In an embodiment, the SRv6 path segment compression configuration information is sent through a BGP or a PCEP. A sub-TLV of the BGP or the PCEP includes: a second bit flag as an extension for indicating that the path segment identifier needs to be compressed and the sub-TLV carries the SRv6 path segment compression configuration information; and a compressed sub-sub-TLV of the path segment identifier as an extension for indicating the SRv6 path segment compression configuration information.

An embodiment of the present application further provides an information exchange apparatus. FIG. 13 is a structural diagram of an information exchange apparatus according to an embodiment. As shown in FIG. 13, the information exchange apparatus includes an information receiving module 410 and a sending module 420.

The information receiving module 410 is configured to receive SRv6 path segment compression information reported by a second communication node, where the SRv6 path segment compression information includes node construction information and node behavior information of an SRv6 path segment identifier. The sending module 420 is configured to send SRv6 path segment compression configuration information to a third communication node according to the SRv6 path segment compression information.

The information exchange apparatus in the embodiment receives the SRv6 path segment compression information reported by the second communication node and sends the SRv6 path segment compression configuration information to the third communication node so that the SRv6 path segment identifier is compressed, reducing the overhead of the path segment identifier, and the second communication node and the third communication node exchange efficiently, improving the processing efficiency of a chip and providing a reliable basis for establishing a bidirectional tunnel between the third communication node and the second communication node.

In an embodiment, the node construction information of the SRv6 path segment identifier includes length information of a locator block, length information of a locator node, length information of a function, length information of arguments and a compression encapsulation type of the SRv6 path segment identifier.

In an embodiment, the node behavior information of the SRv6 path segment identifier includes a terminal behavior type of the SRv6 path segment identifier and IGP algorithm type information corresponding to the SRv6 path segment identifier.

In an embodiment, the SRv6 path segment compression configuration information includes common prefix length information of the SRv6 path segment identifier, length information of a compressed SRv6 path segment identifier and the compression encapsulation type.

In an embodiment, a first communication node is a controller.

In an embodiment, the SRv6 path segment compression information is received through a BGP-LS or a PCEP.

In an embodiment, the SRv6 path segment compression configuration information is sent through a BGP or the PCEP.

In an embodiment, a sub-TLV of the BGP-LS or the PCEP includes: a first bit flag as an extension for indicating that the SRv6 path segment identifier needs to be compressed and the sub-TLV carries the SRv6 path segment compression information; a structure sub-sub-TLV of the SRv6 path segment identifier as an extension for representing the node construction information of the path segment identifier; and a behavior sub-sub-TLV of the SRv6 path segment identifier as an extension for representing the node behavior information of the path segment identifier.

In an embodiment, a sub-TLV of the BGP or the PCEP includes: a second bit flag as an extension for indicating that the SRv6 path segment identifier needs to be compressed and the sub-TLV carries the SRv6 path segment compression configuration information; and a compressed sub-sub-TLV of the SRv6 path segment identifier as an extension for indicating the SRv6 path segment compression configuration information.

The information exchange apparatus in the embodiment and the information exchange method applied by the first communication node in the preceding embodiments belong to the same concept. For technical details not described in the embodiment, reference may be made to any one of the preceding embodiments.

An embodiment of the present application further provides an information exchange apparatus. FIG. 14 is a structural diagram of an information exchange apparatus according to another embodiment. As shown in FIG. 14, the information exchange apparatus includes an information determination module 510 and a reporting module 520.

The information determination module 510 is configured to determine SRv6 path segment compression information, where the SRv6 path segment compression information includes node construction information and node behavior information of an SRv6 path segment identifier. The reporting module 520 is configured to report the SRv6 path segment compression information to a first communication node.

The information exchange apparatus in the embodiment reports the SRv6 path segment compression information so that the SRv6 path segment identifier is compressed, reducing the overhead of the path segment identifier, improving the exchange efficiency of the SRv6 path segment identifier and the processing efficiency of a chip, and providing a reliable basis for tunnel establishment.

In an embodiment, the node construction information of the SRv6 path segment identifier includes length information of a locator block, length information of a locator node, length information of a function, length information of arguments and a compression encapsulation type of the path segment identifier; and the node behavior information of the SRv6 path segment identifier includes a terminal behavior type and corresponding IGP algorithm type information.

In an embodiment, a second communication node is a head node or a tail node of an SRv6 network.

In an embodiment, the SRv6 path segment compression information is reported through a BGP-LS or a PCEP.

A sub-TLV of the BGP-LS or the PCEP includes: a first bit flag as an extension for indicating that the SRv6 path segment identifier needs to be compressed and the sub-TLV carries the SRv6 path segment compression information; a structure sub-sub-TLV of the SRv6 path segment identifier as an extension for representing the node construction information of the SRv6 path segment identifier; and a behavior sub-sub-TLV of the SRv6 path segment identifier as an extension for representing the node behavior information of the SRv6 path segment identifier.

The information exchange apparatus in the embodiment and the information exchange method applied by the second communication node in the preceding embodiments belong to the same concept. For technical details not described in the embodiment, reference may be made to any one of the preceding embodiments.

An embodiment of the present application further provides a tunnel establishment apparatus. FIG. 15 is a structural diagram of a tunnel establishment apparatus according to an embodiment. As shown in FIG. 15, the tunnel establishment apparatus includes a configuration information receiving module 610 and a tunnel establishment module 620.

The configuration information receiving module 610 is configured to receive SRv6 path segment compression configuration information sent by a first communication node. The tunnel establishment module 620 is configured to establish a tunnel with a second communication node according to the SRv6 path segment compression configuration information.

The tunnel establishment apparatus in the embodiment receives SRv6 path segment compression configuration information sent by the first communication mode and establishes the tunnel according to the compressed SRv6 path segment identifier, reducing the overhead of the path segment identifier, achieving an efficient exchange, and improving the processing efficiency of a chip. On this basis, the tunnel is accurately established.

In an embodiment, the SRv6 path segment compression configuration information includes common prefix length information of an SRv6 path segment identifier, length information of the compressed SRv6 path segment identifier and a compression encapsulation type.

In an embodiment, a third communication node is a head node of an SRv6 network.

In an embodiment, the SRv6 path segment compression configuration information is sent through a BGP or a PCEP. A sub-TLV of the BGP or the PCEP includes: a second bit flag as an extension for indicating that the path segment identifier needs to be compressed and the sub-TLV carries the SRv6 path segment compression configuration information; and a compressed sub-sub-TLV of the path segment identifier as an extension for indicating the SRv6 path segment compression configuration information.

The tunnel establishment apparatus in the embodiment and the tunnel establishment method applied by the third communication node in the preceding embodiments belong to the same concept. For technical details not described in the embodiment, reference may be made to any one of the preceding embodiments.

An embodiment of the present application further provides a communication node. The information exchange method applied by a first communication node may be performed by an information exchange apparatus. The information exchange apparatus may be implemented by software and/or hardware and integrated in the communication node. In this case, the communication node is the first communication node such as a controller or a network management device.

In one embodiment, the information exchange method applied by a second communication node may be performed by an information exchange apparatus. The information exchange apparatus may be implemented by software and/or hardware and integrated in the communication node. In this case, the communication node is the second communication node such as a tail node of an SRv6 network.

In one embodiment, the tunnel establishment method applied by a third communication node may be performed by a tunnel establishment apparatus. The tunnel establishment apparatus may be implemented by software and/or hardware and integrated in the communication node. In this case, the communication node is the third communication node such as a head node of an SRv6 network.

Figure 16:
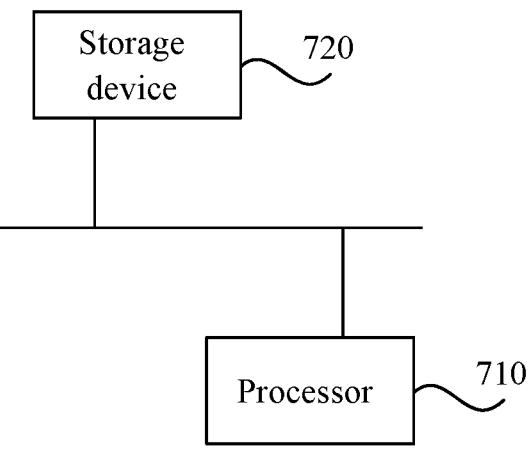
FIG. 16 is a structural diagram of hardware of a communication node according to an embodiment.

FIG. 16 is a structural diagram of hardware of a communication node according to an embodiment. As shown in FIG. 16, the communication node provided in the embodiment includes a processor 710 and a storage device 720. The communication node may include one or more processors. One processor 710 is shown as an example in FIG. 16. The processor 710 and the storage device 720 in the communication node may be connected via a bus or in other manners. The connection via a bus is shown as an example in FIG. 16.

One or more programs are executed by one or more processors 710 to cause the one or more processors to perform the information exchange method or the tunnel establishment method in any one of the preceding embodiments.

As a computer-readable storage medium, the storage device 720 in the communication node may be configured to store one or more programs which may be software programs, computer-executable programs and modules, such as program instructions/modules (for example, modules in the information exchange apparatus, which include an information receiving module 410 and a sending module 420, as shown in FIG. 13) corresponding to the information exchange method in embodiments of the present application. The processor 710 executes software programs, instructions and modules stored in the storage device 720 to perform various function applications and data processing of the communication node, that is, to implement the information exchange method or the tunnel establishment method in the preceding method embodiments.

The storage device 720 mainly includes a program storage region and a data storage region. The program storage region may store an operating system and an application program required by at least one function. The data storage region may store data (such as the SRv6 path segment compression information and the SRv6 path segment compression configuration information in the preceding embodiments) created based on the use of the communication node. The storage device 720 may include a high-speed random-access memory and may also include a nonvolatile memory, such as at least one magnetic disk memory, a flash memory or another nonvolatile solid-state memory. In some examples, the storage device 720 may include memories which are remotely disposed with respect to the processor 710. These remote memories may be connected to the communication node via a network. Examples of the preceding network include, but are not limited to, the Internet, an intranet, a local area network, a mobile communication network and a combination thereof.

When the one or more programs included in the communication node are executed by the one or more processors 710, the following operations are performed: SRv6 path segment compression information reported by a second communication node is received, where the SRv6 path segment compression information includes node construction information and node behavior information of an SRv6 path segment identifier; and SRv6 path segment compression configuration information is sent to a third communication node according to the SRv6 path segment compression information.

In one embodiment, when the one or more programs included in the communication node are executed by the one or more processors 710, the following operations are performed: SRv6 path segment compression information is determined, where the SRv6 path segment compression information includes node construction information and node behavior information of an SRv6 path segment identifier; and the SRv6 path segment compression information is reported to a first communication node.

In one embodiment, when the one or more programs included in the communication node are executed by the one or more processors 710, the following operations are performed: SRv6 path segment compression configuration information sent by a first communication node is received; and a tunnel with a second communication node is established according to the SRv6 path segment compression configuration information.

The communication node in the embodiment and the information exchange method or the tunnel establishment method in the preceding embodiments belong to the same concept. For technical details not described in the embodiment, reference may be made to any one of the preceding embodiments.

An embodiment of the present application further provides an information exchange system. The system includes the first communication node in any one of the preceding embodiments, the second communication node in any one of the preceding embodiments and the third communication node in any one of the preceding embodiments. The first communication node receives SRv6 path segment compression information reported by the second communication node based on a BGP-LS or a PCEP, where SRv6 path segment compression information includes node construction information and node behavior information of an SRv6 path segment identifier and sends BGP- or PCEP-based SRv6 path segment compression configuration information to the third communication node according to the SRv6 path segment compression information.

In an embodiment, the node construction information of the SRv6 path segment identifier includes length information of a locator block, length information of a locator node, length information of a function, length information of arguments and a compression encapsulation type of the SRv6 path segment identifier.

In an embodiment, the node behavior information of the SRv6 path segment identifier includes a terminal behavior type of the SRv6 path segment identifier and IGP algorithm type information corresponding to the SRv6 path segment identifier.

In an embodiment, the SRv6 path segment compression configuration information includes common prefix length information of the SRv6 path segment identifier, length information of the compressed SRv6 path segment identifier and the compression encapsulation type.

In an embodiment, the first communication node is a controller.

In an embodiment, the SRv6 path segment compression information is received through the BGP-LS or the PCEP.

In an embodiment, the SRv6 path segment compression configuration information is sent through a BGP or the PCEP.

In an embodiment, a sub-TLV of the BGP-LS or the PCEP includes: a first bit flag as an extension for indicating that the SRv6 path segment identifier needs to be compressed and the sub-TLV carries the SRv6 path segment compression information; a structure sub-sub-TLV of the SRv6 path segment identifier as an extension for representing the node construction information of the path segment identifier; and a behavior sub-sub-TLV of the SRv6 path segment identifier as an extension for representing the node behavior information of the path segment identifier.

In an embodiment, a sub-TLV of the BGP or the PCEP includes: a second bit flag as an extension for indicating that the SRv6 path segment identifier needs to be compressed and the sub-TLV carries the SRv6 path segment compression configuration information; and a compressed sub-sub-TLV of the SRv6 path segment identifier as an extension for indicating the SRv6 path segment compression configuration information.

The information exchange system in the embodiment compresses the SRv6 path segment identifier, reducing the overhead of the path segment identifier, and the second communication node and the third communication node exchange efficiently, improving the processing efficiency of a chip and providing a reliable basis for establishing a bidirectional tunnel between the third communication node and the second communication node. For technical details not described in the embodiment, reference may be made to any one of the preceding embodiments.

An embodiment of the present application further provides a storage medium including a computer-executable instruction. The computer-executable instruction, when executed by a computer processor, is used for performing an information exchange method or a tunnel establishment method.

The information exchange method includes: receiving SRv6 path segment compression information reported by a second communication node, where the SRv6 path segment compression information includes node construction information and node behavior information of an SRv6 path segment identifier; and sending SRv6 path segment compression configuration information to a third communication node according to the SRv6 path segment compression information.

In an embodiment, the information exchange method includes: determining SRv6 path segment compression information, where the SRv6 path segment compression information includes node construction information and node behavior information of an SRv6 path segment identifier; and reporting the SRv6 path segment compression information to a first communication node.

The tunnel establishment method includes: receiving SRv6 path segment compression configuration information sent by a first communication node; and establishing a tunnel with a second communication node according to the SRv6 path segment compression configuration information.

From the preceding description of embodiments, it is apparent to those skilled in the art that the present application may be implemented by use of software and general-purpose hardware or may be implemented by hardware. Based on this understanding, the technical solutions of the present application may be embodied in the form of a software product. The computer software product may be stored in a computer-readable storage medium such as a floppy disk, a read-only memory (ROM), a random-access memory (RAM), a flash memory, a hard disk or an optical disk of a computer and includes multiple instructions for causing a computer device (which may be a personal computer, a server or a network device) to perform the information exchange method or the tunnel establishment method in any embodiment of the present application.

The preceding are example embodiments of the present application and are not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for a local technical environment and may be implemented using any suitable data storage technology, such as, but not limited to, a ROM, a RAM and an optical memory device and system (a digital video disc (DVD) or a compact disk (CD)). Computer-readable media may include non-transitory storage media. A data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. An information exchange method, the method being applied by a first communication node and comprising:

receiving segment routing Internet Protocol version 6 (SRv6) path segment compression information reported by a second communication node, wherein the SRv6 path segment compression information comprises node construction information of an SRv6 path segment identifier and node behavior information of the SRv6 path segment identifier; and sending SRv6 path segment compression configuration information to a third communication node according to the SRv6 path segment compression information;

wherein the node construction information of the SRv6 path segment identifier comprises length information of a locator block of the SRv6 path segment identifier, length information of a locator node of the SRv6 path segment identifier, length information of a function of the SRv6 path segment identifier, length information of arguments of the SRv6 path segment identifier and a compression encapsulation type of the SRv6 path segment identifier;

wherein the node behavior information of the SRv6 path segment identifier comprises a terminal behavior type of the SRv6 path segment identifier and interior gateway protocol (IGP) algorithm type information corresponding to the SRv6 path segment identifier;

wherein the SRv6 path segment compression configuration information comprises: common prefix length information of the SRv6 path segment identifier, length information of a compressed SRv6 path segment identifier and a compression encapsulation type of the SRv6 path segment identifier.

2. The method of claim 1, wherein the first communication node is a controller.

3. The method of claim 1, wherein the SRv6 path segment compression information is received through a Border Gateway Protocol-Link State (BGP-LS) or a Path Computation Element Communication Protocol (PCEP).

4. The method of claim 1, wherein the SRv6 path segment compression configuration information is sent through a Border Gateway Protocol (BGP) or a PCEP.

5. The method of claim 3, wherein a sub-tag-length-value (TLV) of the BGP-LS or the PCEP comprises:

a first bit flag as an extension for indicating that the SRv6 path segment identifier needs to be compressed and the sub-TLV carries the SRv6 path segment compression information;

a structure sub-sub-TLV of the SRv6 path segment identifier as an extension for representing the node construction information of the SRv6 path segment identifier; and a behavior sub-sub-TLV of the SRv6 path segment identifier as an extension for representing the node behavior information of the SRv6 path segment identifier.

6. The method of claim 4, wherein a sub-TLV of the BGP or the PCEP comprises:

a second bit flag as an extension for indicating that the SRv6 path segment identifier needs to be compressed and the sub-TLV carries the SRv6 path segment compression configuration information; and a compressed sub-sub-TLV of the SRv6 path segment identifier as an extension for indicating the SRv6 path segment compression configuration information.

7. An information exchange method, the method being applied by a second communication node and comprising:

determining segment routing Internet Protocol version 6 (SRv6) path segment compression information, wherein the SRv6 path segment compression information comprises node construction information of an SRv6 path segment identifier and node behavior information of the SRv6 path segment identifier; and reporting the SRv6 path segment compression information to a first communication node for the first communication node to send SRv6 path segment compression configuration information to a third communication node according to the SRv6 path segment compression information;

wherein the node construction information of the SRv6 path segment identifier comprises length information of a locator block of the SRv6 path segment identifier, length information of a locator node of the SRv6 path segment identifier, length information of a function of the SRv6 path segment identifier, length information of arguments of the SRv6 path segment identifier and a compression encapsulation type of the SRv6 path segment identifier; and the node behavior information of the SRv6 path segment identifier comprises a terminal behavior type and interior gateway protocol (IGP) algorithm type information corresponding to the SRv6 path segment identifier;

wherein the SRv6 path segment compression configuration information comprises: common prefix length information of the SRv6 path segment identifier, length information of a compressed SRv6 path segment identifier and a compression encapsulation type of the SRv6 path segment identifier.

8. The method of claim 7, wherein the second communication node is a head node of an SRv6 network or a tail node of an SRv6 network.

9. The method of claim 7, wherein the SRv6 path segment compression information is reported through a Border Gateway Protocol-Link State (BGP-LS) or a Path Computation Element Communication Protocol (PCEP);

a sub-tag-length-value (TLV) of the BGP-LS or the PCEP comprises:

a first bit flag as an extension for indicating that the SRv6 path segment identifier needs to be compressed and the sub-TLV carries the SRv6 path segment compression information;

a structure sub-sub-TLV of the SRv6 path segment identifier as an extension for representing the node construction information of the SRv6 path segment identifier; and a behavior sub-sub-TLV of the SRv6 path segment identifier as an extension for representing the node behavior information of the SRv6 path segment identifier.

10. A tunnel establishment method, the method being applied by a third communication node and comprising:

receiving segment routing Internet Protocol version 6 (SRv6) path segment compression configuration information sent by a first communication node, wherein the SRv6 path segment compression configuration information is sent by the first communication node according to SRv6 path segment compression information reported by a second communication node, and the SRv6 path segment compression information comprises node construction information of an SRv6 path segment identifier and node behavior information of the SRv6 path segment identifier; and establishing a tunnel with the second communication node according to the SRv6 path segment compression configuration information;

wherein the node construction information of the SRv6 path segment identifier comprises length information of a locator block of the SRv6 path segment identifier, length information of a locator node of the SRv6 path segment identifier, length information of a function of the SRv6 path segment identifier, length information of arguments of the SRv6 path segment identifier and a compression encapsulation type of the SRv6 path segment identifier;

wherein the node behavior information of the SRv6 path segment identifier comprises a terminal behavior type of the SRv6 path segment identifier and interior gateway protocol (IGP) algorithm type information corresponding to the SRv6 path segment identifier;

wherein the SRv6 path segment compression configuration information comprises: common prefix length information of the SRv6 path segment identifier, length information of a compressed SRv6 path segment identifier and a compression encapsulation type of the SRv6 path segment identifier.

11. The method of claim 10, wherein the third communication node is a head node of an SRv6 network.

12. The method of claim 10, wherein the SRv6 path segment compression configuration information is sent through a Border Gateway Protocol (BGP) or a Path Computation Element Communication Protocol (PCEP);

a sub-tag-length-value (TLV) of the BGP or the PCEP comprises:

a second bit flag as an extension for indicating that a path segment identifier needs to be compressed and the sub-TLV carries the SRv6 path segment compression configuration information; and a compressed sub-sub-TLV of the path segment identifier as an extension for indicating the SRv6 path segment compression configuration information.

13. A communication node, comprising:

at least one processor; and a storage device, which is configured to store at least one program;

wherein the at least one program is executed by the at least one processor to cause the at least one processor to perform the information exchange method of claim 1.

14. A non-transitory computer-readable storage medium, which is configured to store a computer program, wherein the program is executed by a processor to cause the processor to perform the information exchange method of claim 1.

15. A communication node, comprising:

at least one processor; and a storage device, which is configured to store at least one program;

wherein the at least one program is executed by the at least one processor to cause the at least one processor to perform the information exchange method of claim 7.

* * * * *